United States Patent [19]

Ozaki et al.

[11] 4,436,468
[45] Mar. 13, 1984

[54] BALL HEAD LOCK NUT AS A COMPONENT ELEMENT OF BICYCLE HEAD PARTS

[75] Inventors: Nobuo Ozaki; Yoshimasa Kaneko, both of Osaka, Japan

[73] Assignee: Maeda Industries, Ltd., Osaka, Japan

[21] Appl. No.: 399,978

[22] Filed: Jul. 20, 1982

[30] Foreign Application Priority Data

Jul. 20, 1981 [JP] Japan ............... 56-108527[U]

[51] Int. Cl.³ ............................................. F16B 39/34
[52] U.S. Cl. ................................. 411/248; 411/295; 411/304; 411/315; 403/320; 403/326; 403/362; 280/279
[58] Field of Search .............. 280/279; 74/531; 403/320, 317, 316, 326, DIG. 7, 366, 362; 411/246, 247, 248, 249, 294, 303, 304, 315, 316, 317

[56] References Cited

U.S. PATENT DOCUMENTS 602,120  4/1898  Wright .................... 411/294
2,062,424 12/1936  Mueller ................. 403/DIG. 7
3,237,976  3/1966  Campoli ................. 411/315 X
4,268,055  5/1981  Bell ...................... 280/279 X

OTHER PUBLICATIONS

Japan's Bicycle Guide 1982, Riding the World, Desk Side Edition, vol. 32.

Primary Examiner—Cornelius J. Husar
Assistant Examiner—Joseph A. Fischetti
Attorney, Agent, or Firm—Birch, Stewart, Kolasch & Birch

[57] ABSTRACT

In a ball head lock nut as a component element of bicycle head parts, a split clamping ring is received within an annular groove formed in a threaded, cylindrical internal wall of a substantially annular nut body; a deformable fixing piece, which has a diametrically extending slot formed in its inner end wall, is disposed within a radially extending threaded through hole formed in the annular nut body, with the slot engaged with a part of the split clamping ring; and a set screw is screwed into the radially extending threaded through hole to push the deformable fixing piece axially inwardly for forcible compression and deformation.

4 Claims, 6 Drawing Figures

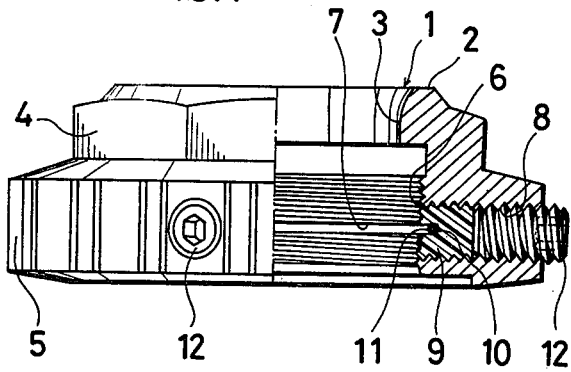
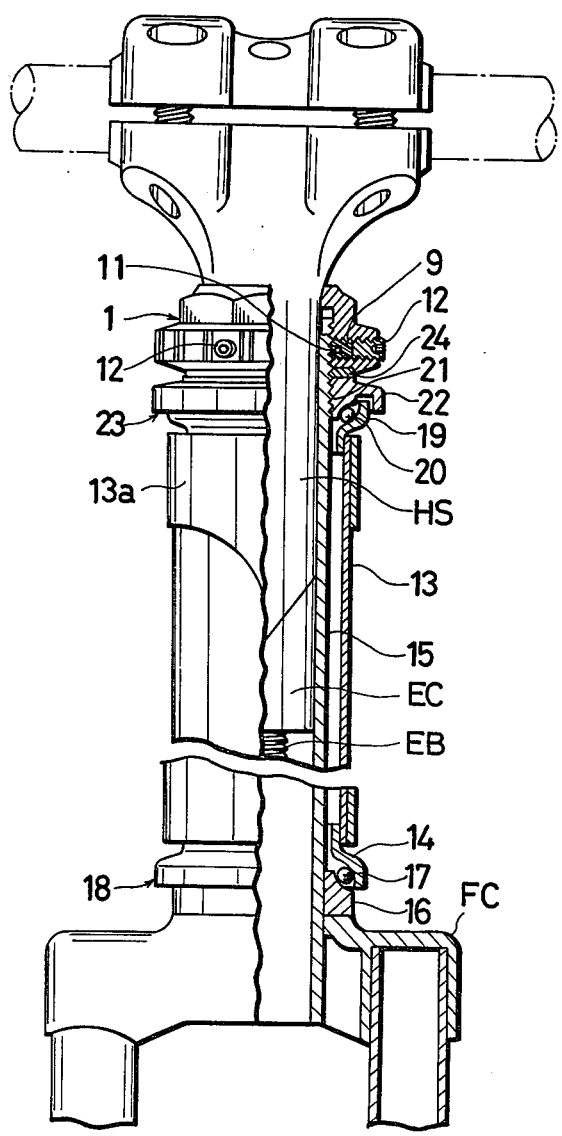
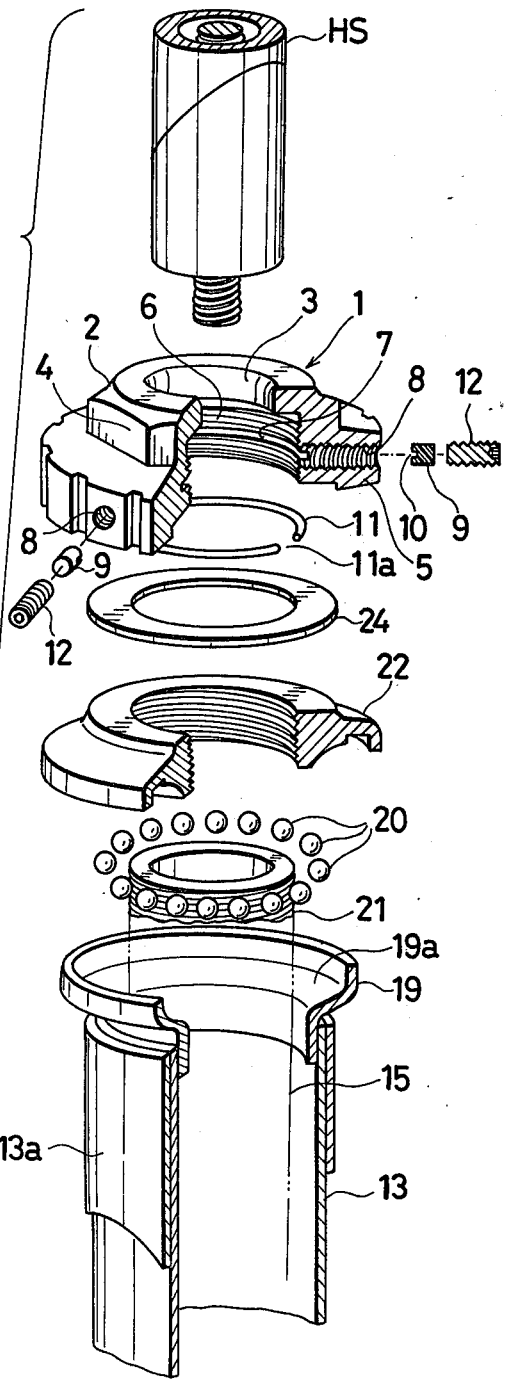

BALL HEAD LOCK NUT AS A COMPONENT ELEMENT OF BICYCLE HEAD PARTS

BACKGROUND AND SUMMARY OF THE INVENTION

This invention relates to a ball head lock nut as a component element of bicycle head parts which cooperate to rotatably support a front fork stem within a head tube of a bicycle frame.

Various models of the bicycle head parts have heretofore been proposed and many of them are currently available in the commercial markets as presented, for example, in "JAPAN'S BICYCLE GUIDE 1982", Vol. 32, Pages 46–53. As apparent from those currently available models, the bicycle head parts are generally assembled in such a manner as illustrated in FIG. 6 of the accompanying drawings.

Referring now to FIG. 6 illustrating a typical prior art construction, a front fork stem (b), which is rigidly connected with a pair of known fork blades (r) by means of a fork crown (f), is inserted into a head tube (a), while a handle stem (HS), which supports a handle bar (HB) at the top as illustrated, is inserted into and fixed to the fork stem (b) by means of an expander cone (EC) which is adjustable by turning an expander bolt (EB). A substantially annular shaped bottom ball head cup (h) is fixedly secured to the lower end of the head tube (a), while a crown cone (g) is fixedly secured to the top side of the fork crown (f). A plural number of steel balls (i), preferably held in a ball retainer (not shown), are interposed for free rotation between the bottom ball head cup (h) and the crown cone (g), so that a lower ball bearing unit (d) consisting of the cooperating three elements (h), (i) and (g) is provided. The lower ball bearing unit (d) serves as a thrust-radial ball bearing.

On the other hand, a substantially annular shaped top ball head cup (j) is fixedly secured to the upper end of the head tube (a), while an internally threaded top cone (m) is mounted by threads on a threaded upper end section (k) of the fork stem (b). A plural number of steel balls (n), preferably held in a ball retainer (not shown), are interposed for free rotation between the top cone (m) and the top ball head cup (j), so that an upper ball bearing unit (c) consisting of the cooperating three elements (m), (n) and (j) is provided. The upper ball bearing unit (c) also serves as a thrust-radial ball bearing.

Thus, the upper and the lower ball bearing units (c) (d) cooperate to support the fork stem (b) together with the handle stem (HS) so as to be relatively rotatable with respect to the head tube (a) which is stationary.

A ball head lock nut (o) is adjustably capped by threads onto the top portion of the threaded upper end section (k) of the fork stem (b) so as to properly depress the top cone (m) in order to prevent the top cone (m) from becoming undesirably loosened or unscrewed.

If desired, one or two locking washers (only one washer (p) is shown in FIG. 6) may be employed. The locking washer (p) is usually formed with a certain rotation preventing means(not shown) in the form of, for example, at least one internal claw or detent projection extending radially inwardly from an inner cylindrical wall thereof, at least one notch formed in the outer cylindrical wall thereof, internal threads engageable with the threaded section (k) of the fork stem (b), serration formed in the lower annular wall of the locking washer for engagement with cooperative serration of the top cone, or combination of selected two of those means as disclosed in the above-referrred "JAPAN'S BICYCLE GUIDE 1982" Vol. 32, Pages 46–53. Thus, when the locking washer (p) is operatively placed between the ball head lock nut (o) and the top cone (m), the washer (p), the lock nut (o) and the top cone (m) cooperate with each other to prevent the top cone (m) from loosening or unscrewing, resulting in that the undesirable loosening in the bearing units (c) and (d) can be prevented to a certain degree.

To prevent the loosening in the bearing units (c)(d) is very important from the viewpoint of durability of the bicycle head parts. In case the bearing units (c)(d) remain loosened, all or some of the bearing surfaces of the top cone (m), the top ball head cup (j), the bottom ball head cup (h) and/or the crown cone (g) are likely to be damaged by beating actions of the steel balls (n) and/or (i) caused by intense vibrations occurring when a bicycle is running on a rough ground surface. Once the bearing surfaces are injured, smooth rotation in the ball bearing units (c)(d) is no longer expected. This disadvantage is especially true with the motocross type bicycles which are used for the bicycle motocross racing now very popular in the United States and some other countries. In the motocross racing, as is well known, a participant has to drive his bicycle on a very rough racing field, and his bicycle is subject to frequent jumps and quick turns.

In particular, when a bicycle jumps up and lands down, such a considerably great impact force or shock is occasionally imparted to the head parts and the head tube via the fork stem, that some of those are momentarily subject to a very slight elastic deformation which causes at the same moment to provide a very narrow gap between the ball head lock nut (o) and the locking washer (p) and/or between the washer (p) and the top cone (m), with the result that the relative and cooperative inter-locking state among the head parts is momentarily released. Therefore, if the fork stem (b) is rotated at this very moment by the cyclist's handle operation, the ball head lock nut (o) is easy to become very slightly loosened. And, if this very slight loosening is repeated, the ball head lock nut (o) becomes more and more loosened, which causes the undesirable loosening in the ball bearing units (c)(d).

It is, therefore, an object of the present invention to provide an improved bicycle ball head lock nut having means for effectively preventing undesirable self-loosening or unscrewing thereof with respect to a threaded upper end section of a bicycle fork stem.

Another object of the invention is to provide an improved bicycle ball head lock nut which is applicable to a motocross type bicycle.

Specifically, the present invention contemplates an improved bicycle ball head lock nut which comprises a split clamping ring disposed within an annular groove formed in a threaded cylindrical internal wall of the ball head lock nut. One or more radially extending threaded through holes are provided each communicated at inner end with the annular groove. A deformable fixing piece which has a diametrically extending slot formed in its inner end wall is disposed within each radially extending threaded through hole, with its diametrically extending slot engaged with the split clamping ring. A set screw screwed into each radially extending threaded through hole is provided until it compresses the fixing piece and makes the same forcibly deformed so as to be tightly engaged with the threads of the radially extending threaded through hole as well as the threads of a threaded upper end section of a fork stem on which the ball head lock nut is capped.

BRIEF DESCRIPTION OF THE DRAWINGS

FIG. 1 is an enlarged front elevation with one half shown in section;

FIG. 2 is an exploded perspective view illustrating upper bicycle head parts together with a handle stem, a head tube and a fork stem(in phantom lines), with parts broken away for clarity;

FIG. 3 is a front elevation, with parts broken away, illustrating the bicycle head parts assembled to a bicycle frame;

DETAILED DESCRIPTION OF THE PREFERRED EMBODIMENT

Figure 6:
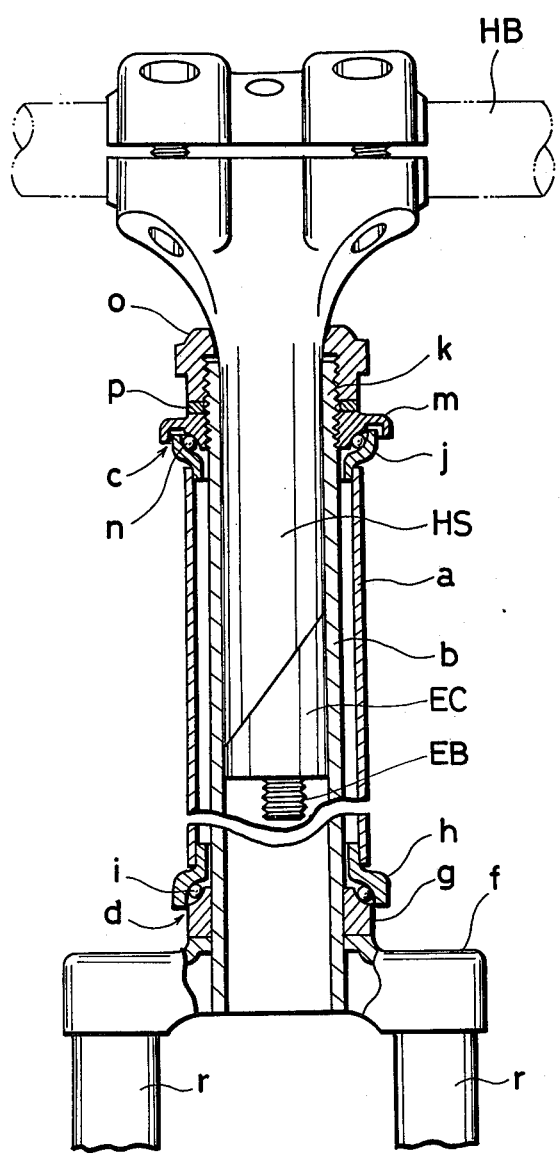
FIG. 6 is a front elevation, partly in section, showing a typical example of prior art construction.

Referring now to the accompanying drawings, a bicycle ball head lock nut 1 according to the present invention may preferably have a reduced, substantially annular shaped upper body portion 2 and an enlarged, substantially annular shaped lower body portion 5. The upper body portion 2 is formed with a non-threaded axial hole 3 for insertion of a known handle stem HS. The upper body portion 2 may be formed with a hexagonal outer circumferential wall 4 for engagement with a conventional clamping tool, for example, a spanner, a wrench of the like (not shown).

The lower body portion 5 is formed with an internally threaded axial hole 6 which is communicated with the non-threaded axial hole 3. The lower body portion 3 is further formed with one or more, preferably two to four, spaced(if plurality) and radially extending threaded through hole(s) communicated at inner end with the threaded axial hole defined by a threaded, cylindrical internal wall 6. In order to obtain a sufficient length of the radially extending threaded through hole 8, the circumferential wall thickness of the larger body portion 5 may preferably be greater than that of a conventional one.

An annular groove 7 is formed in the threaded, cylindrical internal wall 6 of the lower body portion 5, in such a manner that the annular groove 7 is communicated with each of the radially extending threaded through holes 8. Preferably, the annular groove 7 passes diametrically across each of the radially extending threaded through holes 8.

A split clamping ring 11, which is made of elastic metal and split at 11a as shown in FIG. 2, is received(-preferably fit snappingly) within the annular groove 7 and extends transversely of each radially extending threaded through hole 8.

A deformable fixing piece 9, preferably in the form of a cylindrical solid piece made of synthetic resin or the like deformable material, is disposed within each of the radially extending threaded through holes 8. The fixing piece 9 has a diametrically extending slot 10 formed in its inner end wall so as to receive a part of the clamping ring 11 therein when it is in operation.

A set screw 12, preferably a hexagon socket head screw, is engaged with each of the radially extending threaded through holes 8. As the set screw 12 is screwed into the threaded hole 8, it pushes the fixing piece 9 axially inwardly, so that the diametrically extending slot 10 of the fixing piece 9 comes into engagement with a part of the split clamping ring 11. If the set screw 12 is further screwed so as to advance further, the fixing piece 9 is compressed and finally deformed as will be hereinafter described in detail.

In assembly, a fork stem 15 is inserted into a head tube 13 from the lower end opening thereof until its threaded upper end section 21 projects out of the upper end opening of the head tube 13, as shown in FIG. 3. A known bottom ball head cup 14 is fixedly secured to the lower end of the head tube 13, while a known crown cone 16 is fixedly secured to the top side of the fork crown FC, conventionally. A plural number of steel balls 17, preferably held in a known ball retainer(not shown), are interposed for free rotation between the bottom ball head cup 14 and the crown cone 16, so that a lower ball bearing unit 18 consisting of the cooperating three elements 14,17,18 is provided.

After the lower ball bearing unit 18 has been assembled, a known top ball head cup 19 is fixedly secured to the upper end of the head tube 13. Then, a plural number of steel balls 20, preferably held in a known ball retainer(not shown), are placed in an annular space defined by an internal annular circumference 19a of the top ball head cup 19 and an external cylindrical wall of the fork stem 15. Then, a known, internally threaded top cone 22 is mounted by threads on the threaded upper end section 21 of the fork stem 15, so that the steel balls 20 are interposed for free rotation between the top cone 22 and the top ball head cup 19, conventionally, with the result that an upper ball bearing unit 23, which consists of the cooperating three elements 20,21,22, is provided. Thus, the fork stem 15, into which the handle stem HS is inserted and fixed by a known expander cone EC and a bolt EB, can be rotatably supported within the head tube 13 by means of the ball bearing units 18, 23. Incidentally, reference numeral 13a in FIGS. 2 and 3 designates a reinforcing tube which may be employed if desired.

Then, the ball head lock nut 1 is capped by threads onto the top portion of the threaded upper end section 21 of the fork stem 15, preferably with a known washer 24 sandwiched between the top cone 22 and the ball head lock nut 1. When the ball head lock nut 1 is capped onto the top portion of the fork stem 15, it should be adjusted by threads so as to properly depress the top cone 22 in order to prevent the top cone 22 from becoming undesirably loosened or unscrewed, or otherwise the undesirable loosening is likely to occur in the upper and the lower ball bearing units 23, 18, which invites damage to the ball bearing units.

Figure 4:
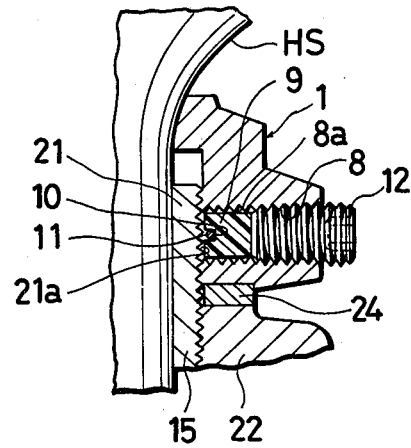
FIG. 4 is an enlarged, fragmental section showing a deformable fixing piece before it is deformed.
Figure 5:
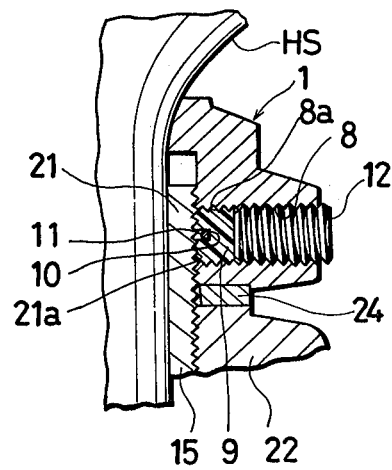
FIG. 5 is a similar view to FIG. 4, showing the deformable fixing piece after it has been deformed.

After the ball head lock nut 1 has been adjusted to a proper clamping position with respect to the top portion of the fork stem 15, the set screw 12, which is in engagement with each of the radially extending threaded through holes 8, is screwed up so as to advance axially inwardly to push the deformable fixing piece 9 axially inwardly until the diametrically extending slot 10 thereof comes into engagement with the clamping ring 11, as best shown in FIG. 4. By further screwing the set screw 12, the deformable fixing piece 9, which is prevented from turning because of the engagement with the clamping ring 11, is forcibly deformed so that its inner end wall is forced to bite into the threads 21a of the threaded upper end section 21 of the fork stem 15 for firm engagement therewith, and at the same time, the circumferential wall of the fixing piece 9 is forced to bite into the threads 8a of the threaded hole 8 for firm engagement therewith, as best shown in FIG. 5. It will be easily understood that the fixing piece 9 can be effectively deformed so as to bite into the threads 8a, 21a, because, when forcibly deformed, the fixing piece 9 is prevented from turning by the firm engagement with the clamping ring 11, as discussed above.

Thus, in operation, the ball head lock nut 1 is effectively prevented from becoming undesirably loosened or unscrewed, by considerable frictional forces developed by the above-discussed firm engagement of the compressed(preferably compressed to its maximum) and deformed fixing piece 9 with the threads 8a and 21a.

By properly arranging a plurality or radially extending threaded through holes 8 and the cooperating fixing pieces 12, it is possible to more effectively prevent the ball head lock nut 1 from the undesirable self-loosening. For instance, in the case where a pair of radially extending threaded through holes 8 are formed in the ball head lock nut 1 so as to be angularly spaced at an angle of substantially 120° from each other as shown in FIG. 2, the threaded upper end section 21 of the fork stem 15 is strongly pressed away by the inner end wall of each of the pair of deformed fixing pieces 9, resulting in that the threaded end section 21 of the fork stem 15 is forced to be firmly engaged with the threaded internal wall 6 of the ball head lock nut 1 at such an area most remote from either of the two threaded through holes 8. As a result, the ball head lock nut 1 in this case can be effectively prevented from undesirable self-loosening.

As is well known, the ball head lock nut and the top cone cooperate to provide a so-called double nut effect. Thus, in case the ball head lock nut 1 is effectively prevented from self-loosening in the manner as described in detail in the foregoing, the double nut effect is naturally the more enhanced.

It will be easily understood that the fixing piece 9 can be retained in each of the radially extending threaded through holes 8 by means of the set screw 12 and the clamping ring 11. Thus, the fixing piece 9 can be prevented from falling out of the hole 8 and become missing, for example, during transportation of the ball head lock nuts or in an assembly line in a factory.

The present invention being thus described, it well be obvious that the same may be varied in many ways. Such variations are not to be regarded as a departure from the spirit and scope of the invention, and all such modifications as would be obvious to those skilled in the art are intended to be included within the scope of the following claims.

We claim:

1. A ball head lock nut as a component element of bicycle head parts, which comprises
   a substantially annular body having a threaded, cylindrical internal wall,
   an annular groove formed in said threaded, cylindrical internal wall,
   a split clamping ring received within said annular groove,
   at least one radially extending threaded through hole formed in said annular body with its inner end passing through said annular groove,
   a deformable fixing piece having a diametrically extending slot formed in its inner end wall,
   said deformable fixing piece being disposed within said radially extending threaded through hole, with said slot engaged with a part of said clamping ring, and
   a set screw screwed into said radially extending threaded through hole to push said deformable fixing piece axially inwardly for forcible compression and deformation of said deformable fixing piece.

2. The ball head lock nut as defined in claim 1, wherein said deformable fixing piece is formed of synthetic resin.

3. The ball head lock nut as defined in claim 1, wherein said substantially annular body has a reduced, substantially annular shaped upper body portion and an enlarged, substantially annular shaped lower body portion,
   said lower body portion being greater in wall thickness than said upper body portion and having said threaded, cylindrical internal wall, and
   said at least one radially extending threaded through hole is formed in said lower body portion with its inner end passing through said annular groove formed in said threaded, cylindrical internal wall of said lower body portion.

4. The ball head lock nut as defined in claim 1, wherein
   a pair of radially extending threaded through holes are formed in said annular body with their inner end passing through said annular groove,
   said pair of radially extending threaded through holes being angularly spaced at an angle of substantially 120° from each other, and
   a deformable fixing piece and a set screw are disposed within each of said pair of radially extending threaded through holes.

* * * * *